United States Patent Office 3,632,775
Patented Jan. 4, 1972

3,632,775
METHOD FOR THE TREATMENT OF GASTEROPHILUS INTESTINALIS
George E. Brightenback, Stanton, and Elbert E. Harris, Westfield, N.J., assignors to Merck & Co., Inc., Rahway, N.J.
No Drawing. Filed Apr. 20, 1970, Ser. No. 30,310
Int. Cl. A61k 27/00
U.S. Cl. 424—322     3 Claims

ABSTRACT OF THE DISCLOSURE

Method for treating Gasterophilus intestinalis, or common bot in horses, which comprises administering cyclohexane or a cyclohexane generating complex to a host suffering with said disease.

BACKGROUND OF THE INVENTION

This invention relates to a process for treating Gasterophilus intestinalis or common bot in horses. More specifically, it relates to the use of cyclohexane or cyclohexane generating complex as a therapeutic substance in the treatment of common bot.

Gasterophilus intestinalis or common bot is a parasitic disease in horses caused by the larvae of bot flies. The eggs of the bot fly are glued to the hairs of almost any part of the body, especially the forelegs and shoulders. The larvae hatch in about seven days when properly stimulated, usually by licking, and apparently remain for about a month around the molar teeth or embedded in the mucosa of the mouth. Then the larvae pass to the stomach where they attach themselves to the cardiac or pyloric portions as well as the mucosa of the first part of the small intestine. After a development period of about 8–10 months, they are excreted by the host. The most commonly encountered clincal sign is a digestive disturbance. Compounds which have been used to treat Gasterophilus intestinalis include carbon disulfide, piperazine carbodithioic acid, and trichlorfon (O,O-dimethyl-1-hydroxy-2,2,2-trichloroethyl phosphonate).

DESCRIPTION OF THE INVENTION

An object of the present invention is to provide a method for the treatment of Gasterophilus intestinalis or common bot in horses. A further object is to provide a method of treating horses infested with bots by removing the internal parasite with an active chemical agent. An additional object is to afford removal of the internal parasite by utilizing cyclohexane or a complex capable of generating cyclohexane as the active chemical agent. Further objectives will be evident from the following description of the invention.

In accordance with the present invention, it has now been found that cyclohexane and certain complexes capable of generating cyclohexane, for example, cyclohexane-thiourea complex, are highly effective for the treatment of Gasterophilus intestinalis in horses. The active agent, cyclohexane, has been found to have a lethal and narcotizing effect on the bots attached to the stomach of the horse without causing serious damage to the host.

In one embodiment of this invention cyclohexane-thiourea complex is administered orally to a bot-infested horse. The activity of the treating agent can be determined by collecting the feces and counting the bots which have been removed from the usual site of attachment in the host's stomach. After a horse has been treated with the active agent, the animal may be killed one to several days after treatment and a necropsy performed to determine the lethal and narcotizing effect of the cyclohexane on Gasterophilus larvate. Examination of the stomach, small intestine, large colon, small colon, as well as the rectum, allows actual count of bots which survive the treatment and remain attached to the stomach, as well as bots which have been effected by the treating agent and have moved further down the intestinal tract. Examination of the stomach lining also reveals a number of "bot sites," or sites of attachment that have been recently occupied by bots. The presence of dead or narcotized bots in areas outside of the stomach, coupled with the relatively large number of bot sites observed on the stomach, indicate the effectiveness of the cyclohexane or cyclohexane generating complex.

The cyclohexane employed in the practice of this invention is commercially available. The cyclohexane-thiourea complex is prepared by adding cyclohexane to an aqueous solution of thiourea at room temperature, filtering off the crystals that are formed and drying the complex to constant weight.

The amount of cyclohexane necessary for adequate control of bots will vary to some degree depending upon the severity of the condition. Good results have been obtained by administering to the infested host from 65 to 294 milligrams per kilogram of body weight. Frequently only a single dose is necessary in order to secure the desired results. However, in some instances, a second administration may be advantageous if administered approximately one month after the initial dose. Repetition of dosing and frequency of dosing depends on the geographical location of the animal and also on the season of the year. Both of these factors influence the life cycle of Gasterophilus flies.

The cyclohexane or cyclohexane-thiourea complex employed in the practice of this invention can be administered orally to a bot-infested horse. Administration of the active material can be accomplished by any of the conventional means for treating horses with oral drugs, for example by a stomach tube, dose syringe, and the like.

EXAMPLE 1

Each of two pony foals (weighing approximately 150 lbs.) is given 20 cc. of cyclohexane equivalent to approximately 294 mg./kg. of body weight via stomach tube. Twenty-four hours after treatment, the ponies are sacrificed and necropsied for bots. The results are found in Table I.

TABLE I.—USE OF CYCLOHEXANE IN TREATING STOMACH BOTS IN HORSES

|  | Number bots at necropsy | | |
|---|---|---|---|
|  | Stomach | Small intestine | Cecum and large colon |
| Pony: |  |  |  |
| A | 2 live bots attached to mucosa, 40 bot sites. | None | 23 dead. |
| B | None, 30 bot sites | None | 18 dead. |

EXAMPLE 2

Two pony colts, with numerous bot eggs on the hairs of their forelegs, are treated with a cyclohexane-thiourea complex which contains 27.5% cyclohexane by weight. Pony C, weighing 136 kg., is given 70 gm. of complex which is equivalent to 141 mg./kg. and Pony D, weighing 109 kg., is given 38 gm. of complex equivalent to 88 mg./kg. of cyclohexane as the complex via stomach tube. The complex is flushed through the tube with approximately 12 ounces of water. Feed is not withheld before treatment. The ponies are observed for toxic effects for approximately six hours, then they are sacrificed and a necropsy performed. The results are found in Table II.

The cyclohexane-thiourea complex is prepared according to the procedure in Comp. rend. 224, 402 (1947).

TABLE II.—USE OF CYCLOHEXANE-THIOUREA COMPLEX IN TREATING STOMACH BOTS IN HORSES

| | Weight (kg.) | Dose/Kg., cyclohexane | Untoward effect | Number of bots at necropsy | | |
|---|---|---|---|---|---|---|
| | | | | Stomach | Small Intestine | Cecum |
| Pony: | | | | | | |
| C | 136 | 141 mg./kg. (70 gm. complex). | None | 12 attached and slightly mobile. 112 unattached and not moving. | 5 dead | 2 dead. |
| D | 109 | 88 mg./kg. (35 gm. complex). | ---do--- | 3 attached and slightly mobile. 43 attached and not moving. | 1 dead | 3 dead. |

EXAMPLE 3

Two ponies are treated with a cyclohexane-thiourea complex which contains 25.7% cyclohexane by weight. Pony E, weighing 120 kg. is given 68 mg./kg. of cyclohexane in the form of the thiourea complex and Pony F, weighing 116 kg. is given 71 mg./kg. of cyclohexane as the complex via stomach tube. The ponies are not fasted and feces are collected for 48 hours. No untoward effects of the drug are observed, and food and water intake remain normal. After 48 hours, the ponies are necropsied and examined for internal parasites. The results of this experiment are found in Table III.

What is claimed is:

1. A method of treating horses to remove bots therefrom which comprises administering orally to said horse an effective amount of a therapeutic compound selected from the group consisting of cyclohexane and cyclohexane-thiourea complex.

2. The method of claim 1 wherein the therapeutic compound is cyclohexane.

3. The method of claim 1 wherein the therapeutic compound is a cyclohexanethiourea complex.

TABLE III

| | Weight (kg.) | Dose kg., cyclohexane, mg. | Bots found at necropsy | | | | | | | Percent efficacy using bot sites as total number of bots |
|---|---|---|---|---|---|---|---|---|---|---|
| | | | Stomach | Bot "sites" in stomach | Small intestine | Large colon | Small colon | Rectum | Bots in manures | |
| Pony: | | | | | | | | | | |
| E | 120 | 68 | 17 live | 101 | 0 | 36 dead | 0 | 3 dead | 8 dead | 83 |
| F | 116 | 71 | 15 live | 59 | 1 dead | 30 dead | 0 | 1 dead | 7 dead | 75 |

References Cited

Hughes: Chem. Abst., vol. 52 (1958), p. 8444e.

SAM ROSEN, Primary Examiner

U.S. Cl. X.R.

424—356